April 1, 1969  M. W. LUNDGREEN  3,436,655
ROTATION MEASURING DEVICE FOR VERY SLOWLY ROTATING SHAFT
Filed April 20, 1966
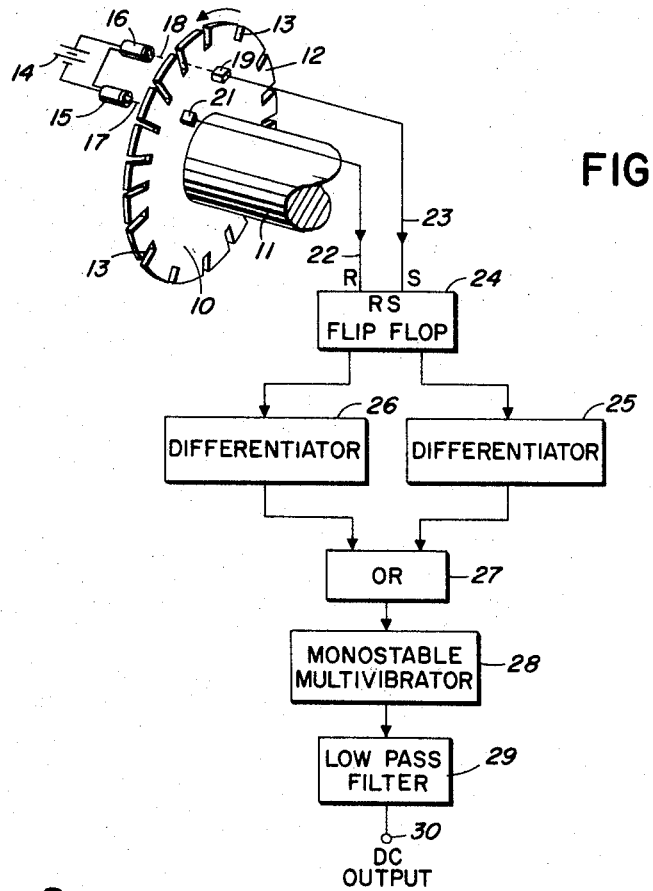
FIG 1
FIG 2
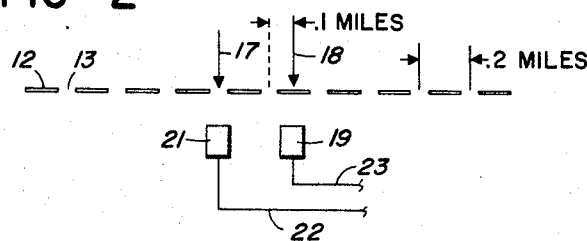
FIG 3
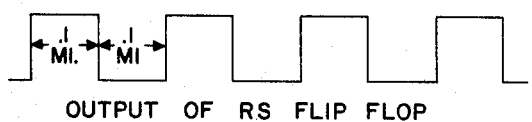
OUTPUT OF RS FLIP FLOP
INVENTOR.
MICHAEL W. LUNDGREEN
BY
ATTORNEYS

United States Patent Office 3,436,655
Patented Apr. 1, 1969

3,436,655
ROTATION MEASURING DEVICE FOR VERY SLOWLY ROTATING SHAFT
Michael W. Lundgreen, Cedar Rapids, Iowa, assignor to Collins Radio Company, Cedar Rapids, Iowa, a corporation of Iowa
Filed Apr. 20, 1966, Ser. No. 543,854
Int. Cl. G01r *11/00, 11/02;* G01d *5/36*
U.S. Cl. 324—70                              3 Claims

ABSTRACT OF THE DISCLOSURE

Shaft rotation measuring means which eliminates errors caused by jitter or back-up of the shaft including a combination of disk having apertures mounted on the shaft, light source on one side of the disk and photoelectric cells on the other side of the disk. A set/reset flip-flop is connected to receive the electrical output of the photocells, and means responsive to the output of the flip-flop indicates speed of rotation of the shaft by producing an analogous D.-C. output.

---

This invention relates generally to a device for measuring shaft rotation and particularly to a device for measuring the revolutions per unit of time of very slow rotating shafts.

In many mechanical systems containing rotating shafts it is frequently necessary to accurately measure the number of rotations per unit time. Examples of such systems are mechanical counters, switching devices or distance measuring equipment (DME). An accurate measurement of slow rotation is normally difficult because the rotating shaft will backup and jitter. These two undesirable motions will affect the measurement and often result in inaccuracies in the measurement. The actual jitter and backup can be very difficult or impossible to eliminate and therefore it is necessary to eliminate their effect. These problems are particularly acute when dealing with distance measuring equipment. In such equipment, a series of indicator disks are located on a plurality of shafts, each shaft rotation being a means of measuring units, tens, hundreds, etc. of the distance desired to be measured. The measurement obtained is dependent upon the shaft rotation and therefore it is necessary to eliminate any errors caused by either jitter or backup of the shaft.

It is therefore an object of this invention to provide a device for measuring the rotation of slow rotating shafts.

It is another object of this invention to provide such a device which will measure rotations which are in the order of one revolution per minute.

It is another object of this invention to provide such a device which will accurately measure extremely slow rotations and which will not be affected by normal amounts of either backup or jitter of the element under consideration.

Further objects, features, and advantages of the invention will become apparent from the following description and claim when read in view of the accompanying drawings wherein like numbers indicate like parts and in which:

FIGURE 1 shows a schematic presentation of the device used to measure shaft rotations and the electrical circuitry used in conjunction therewith;

FIGURE 2 shows the arrangement of the rotating disk, light sources, and photoelectric cells which enables the system to be substantially free of errors caused by shaft backup or jitter; and FIGURE 3 shows the output of the counting circuit and is useful in explaining the calibration of the system.

Referring now to FIGURE 1, a disk 10 is rigidly mounted on shaft 11, the rotation of which it is desired to measure. Disk 10 includes a series of narrow slots 13 to thereby form a plurality of opaque areas 12 between the slots. Mounted on one side of the disk 10 are two similar light sources 15 and 16. These are actuated by a source such as a battery. The light sources are designed such that each source forms a narrow light beam 17 and 18. Situated on the other side of the disk 10 opposite from light source 15 and 16 are two photoelectric cells 19 and 21. Photoelectric cell 19 is arranged such that when any of the slots 13 passes between it and light source 16 the beam of light 18 actuates cell 19. Photocell 21 is similarly arranged with light source 15 such that it is actuated by light beam 17. Photoelectric cells 19 and 21 are respectively connected by lines 23 and 22 to the two inputs of a set/reset flip-flop (RS) 24. The two outputs of flip-flop 24 are connected to differentiators 25 and 26. An OR gate 27 receives the output of both differentiators, and a monostable multivibrator 28 receives the output of OR gate 27. The output of monostable multivibrator 28 is filtered in a low pass filter 29 so that the voltage level of the output of the filter is an indication of the number of counts measured by photocells 19 and 21, and thereby is a function of the revolutions per minute of shaft 11.

In operation, as the slots 13 of disk 10 pass between photocell 19 and light source 16 photocell 19 is actuated to thereby set RS flip-flop 24. Because flip-flop 24 is a set/reset flip-flop an additional output cannot be received from the flip-flop until photocell 21 is actuated. This occurs when a slot 13 passes between cell 21 and light source 15 at which time the reset input of flip-flop 24 is actuated to thereby change the output condition of the flip-flop. In this manner differentiators 25 and 26 are alternately actuated. Differentiation of the RS flip-flop output results in a series of spikes which are fed to OR gate 27. These spikes alternately actuate monostable multivibrator 28 to produce a constant width-constant amplitude output pulse. It should be noted that a single differentiator can be used in place of differentiators 25 and 26. However, filtering of the output to receive a D-C output is then more difficult. Filtering of this pulse in filter 29 results in a D-C voltage the level of which is a direct indication of the output frequency of monostable multivibrator 28. This frequency is directly related to the number of signals per unit of time received from photocells 19 and 21 and therefore the D-C output level is a direct indication of the speed of rotation of shaft 11.

FIGURE 2 is useful in explaining the manner of calibrating disk 10 and in showing how the system is unaffected by either backup or jitter of shaft 11. Assuming that the system is used in distance measuring equipment and that the shaft rotation is calibrated such that one rotation of the shaft indicates ten miles of distance measured, with disk 10 constructed to contain 50 of the slots 13, the distance between the measured centers of consecutive slots is then 0.2 mile.

Under these conditions when light beam 17 actuates photocell 21 light beam 18 falls directly in the middle of one of opaque areas 12. If the shaft now jitters photoelectric cell 21 will randomly be actuated and deactuated by beam 17 due to the random obstruction by one of opaque areas 12. Under these conditions the count obtained from photocell 21 would appear to be higher than it actually is and therefore give an erroneous measurement of the shaft rotation. This is prevented by using a set/reset flip-flop to receive the output of photocells 19 and 21. This is so because after actuation of the reset input of flip-flop 24 the flip-flop will not change state until the set input is actuated by photocell 19. This feature therefore compensates for the jitted of shaft and renders the output reading more accurate.

The same feature of the flip-flop circuit 24, in conjunction with the spacing of light sources 15 and 16, also helps eliminate the effects of backup of shaft 11.

Assuming that shaft 11 is rotating toward the left, as shown in FIGURE 2, the shaft could backup from the center of opaque area 12 to the next succeeding slot before the beam 18 actuates photocell 23. Due to the calibration of the disk this means the shaft can back up nearly a distance analogous to a tenth of a mile before an inaccurate pulse is generated.

Referring now to FIGURE 3, the output of the RS flip-flop is shown. Because photocells 19 and 21 are arranged in the spacing shown in FIGURE 2, the photocells are alternately actuated each one-tenth of a mile of rotation of the shaft. Flip-flop 24 therefore yields a square-wave output with each change of state of the output being an indication of one-tenth of a mile. This output is differentiated to form a series of positive and negative spikes which are fed to monostable multivibrator 28 through OR gate 27. The constant width-constant amplitude pulses of monostable multivibrator 28 are then filtered in low-pass filter 29 to yield a D-C voltage the level of which is an indication of the count rate received from RS flip-flop 24. The number of slots 13 obviously can be varied so that the slot spacing is indicative of any fractional portion of a mile, or other unit of distance. Also the rotation of shaft 11 may be indicative of any linear measurement desired simply by the selection of driving apparatus which will yield the particular rotation desired.

I claim:

1. A device for measuring rotation of a shaft comprising: a calibrated disk rigidly applied to said shaft; said shaft having a plurality of equidistantly spaced apertures and a series of congrunent opaque areas between said apertures; the spacing of said apertures being such that the width of each of said opaque areas is equal to a predetermined portion of one revolution of said shaft; first and second light sensitive means positioned on one side of said disk, a plurality of light sources positioned on the other side of said disk so that said opaque areas interrupt the light communication between said light sensitive means and said light sources as they pass therebetween; said first and second light sensitive means and said plurality of light sources being cooperatively arranged with said disk whereby said first and second light sensitive means never receive light concurrently; a set/reset flip-flop means having set and reset input terminals connected to said first and second light sensitive means, respectively; said first and second light sensitive means and said set/reset flip-flop means cooperatively functioning to eliminate errors caused by jitter or backup of the shift; and means responsive to the output of said set/reset flip-flop means for indicating the speed of rotation of said shaft.

2. The device defined by claim 1 wherein said means responsive to the output of said set/reset flip-flop means includes means for producing a D-C output analogous to the speed of rotation of said shaft.

3. The device defined by claim 2 wherein said means responsive to the output includes differentiator means for differentiating the output of said set/reset flip-flop means, a monostable multivibrator, OR gate means connecting said differentiator means to said monostable multivibrator, and low-pass filter means operably connected to the output of said monostable multivibrator for producing said D-C output analogous to the speed of rotation of said shaft.

References Cited

UNITED STATES PATENTS

| | | | |
|---|---|---|---|
| 2,656,106 | 10/1953 | Stabler | 340—271 |
| 2,685,083 | 7/1954 | Beman | 324—70 |
| 2,788,519 | 4/1957 | Caldwell | 340—271 |
| 2,796,598 | 6/1957 | Cartwright | 324—70 |
| 2,994,783 | 8/1961 | Looschen | 250—231 |
| 2,999,168 | 9/1961 | Henry | 324—70 |

OTHER REFERENCES

Journal of Scientific Instruments, vol. 33, No. 12, December 1956, pp. 483-486.

RUDOLPH V. ROLINEC, *Primary Examiner.*

M. J. LYNCH, *Assistant Examiner.*

U.S. Cl. X.R.

250—233

U.S. DEPARTMENT OF COMMERCE

PATENT OFFICE

Washington, D.C. 20231

UNITED STATES PATENT OFFICE
CERTIFICATE OF CORRECTION

Patent No. 3,436,655                                                      April 1, 1969

Michael W. Lundgreen

It is certified that error appears in the above identified patent and that said Letters Patent are hereby corrected as shown below:

Column 2, line 55, after "the", first occurrence, insert -- measured -- same line 55, after "the", second occurrence, cancel "measured"; line 70, "jitted" should read -- jitter --. Column 3, line 35, "congrunent" should read -- congruent --.

Signed and sealed this 7th day of April 1970.

(SEAL)
Attest:

Edward M. Fletcher, Jr.                                     WILLIAM E. SCHUYLER, JR.

Attesting Officer                                                      Commissioner of Patents